United States Patent [19]
Geray et al.

[11] Patent Number: 4,660,134
[45] Date of Patent: Apr. 21, 1987

[54] DC-DC CONVERTER WITH CHOPPING SWITCH AND TRANSFORMER

[75] Inventors: Jacques Geray, Maisons Laffitte; Gérard Monroy, Beaumont Sur Oise, both of France

[73] Assignee: Auxilec, Colombes, France

[21] Appl. No.: 800,152

[22] Filed: Nov. 20, 1985

[30] Foreign Application Priority Data

Nov. 23, 1984 [FR] France .................................. 84 17930

[51] Int. Cl.⁴ .......................................... H02M 3/335
[52] U.S. Cl. ...................................... 363/20; 363/97; 363/131
[58] Field of Search ..................... 363/20, 21, 27, 28, 363/97, 101, 124, 131, 135; 323/223

[56] References Cited

U.S. PATENT DOCUMENTS 3,443,195  5/1969  Hoffman .............................. 363/20
4,245,285  1/1981  Weiss ................................... 363/17
4,409,647  10/1983  Terkanian ............................ 363/27
4,559,590  12/1985  Davidson ............................. 363/21

*Primary Examiner*—Patrick R. Salce
*Assistant Examiner*—Anita M. Ault
*Attorney, Agent, or Firm*—Oblon, Fisher, Spivak, McClelland & Maier

[57] ABSTRACT

A DC-DC converter is provided, for example of the voltage booster type, comprising a switch controlled for chopping the input signal, a transformer whose primary winding receives the chopped signal and a means for rectifying the signal delivered by the secondary winding of the transformer.

The switch is in parallel across a series assembly formed by the primary of the transformer and a capacitor. The rectifier means comprises a bridge for rectifying a current flowing in both directions.

8 Claims, 3 Drawing Figures

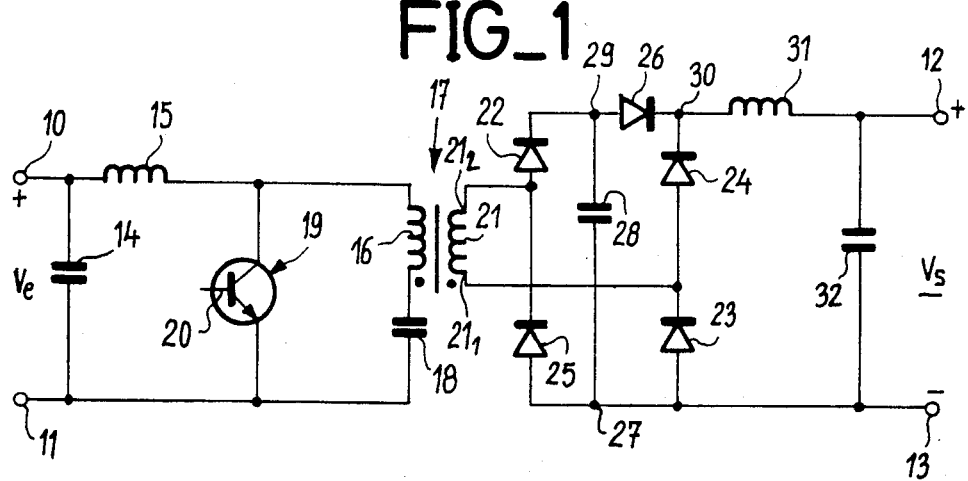
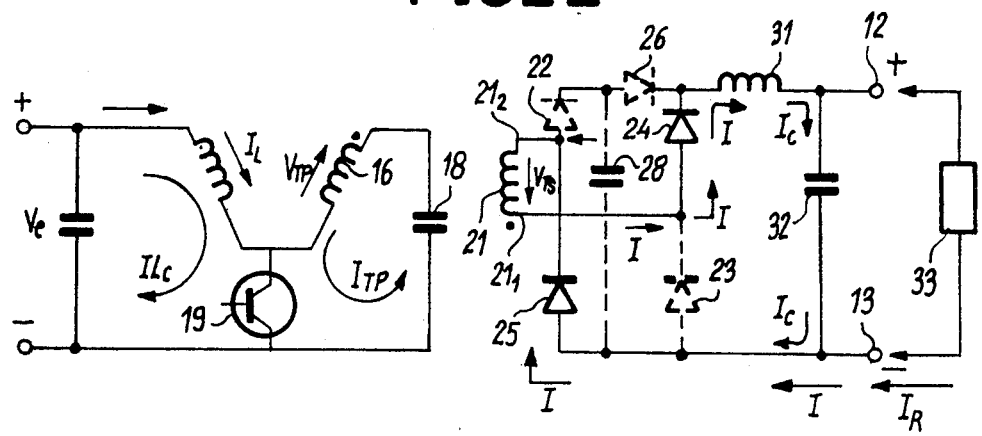
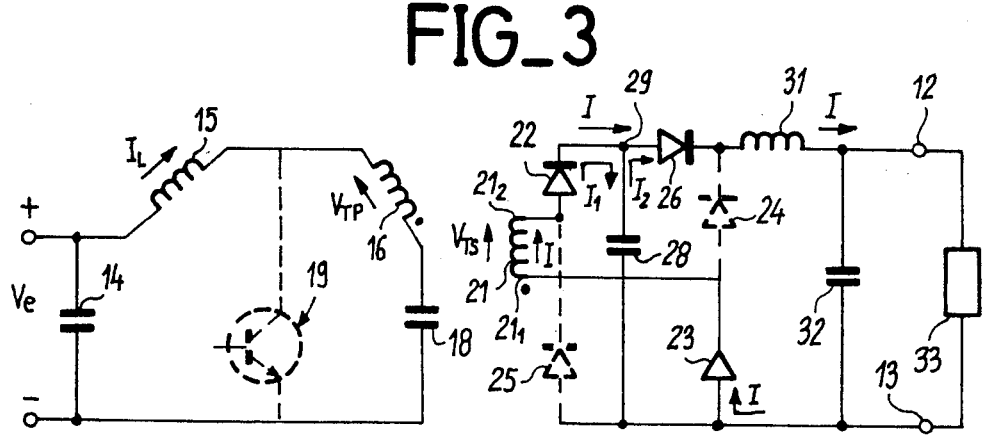

DC-DC CONVERTER WITH CHOPPING SWITCH AND TRANSFORMER

BACKGROUND OF THE INVENTION

1. Field of the Invention

The invention relates to a DC-DC converter more especially of the voltage booster type.

2. Description of the Prior Art

To raise or lower a DC voltage there are usually provided: a single chopping switch for transforming this DC voltage into a periodic voltage, a transformer which boosts or lowers the voltage thus chopped and which isolates the output from the input, as well as a rectifier for converting into a DC voltage the periodic voltage supplied by the secondary of the transformer. In addition, such converters generally comprise an input filter, for example of the LC type, for avoiding reinjection of the chopped current into the power supply source as well as an output filter, for example also of the LC type, for smoothing the rectified current.

In the converters of this type known up to now, the switch is in series with the primary winding of the transformer and at the terminals of this series assembly is disposed in parallel a capacitor which receives the input DC voltage. In a circuit called "direct" or "forward", the secondary winding of the transformer is in the same direction as the primary winding and the energy is transmitted into the secondary circuit only during the conducting phases of the switch. In a so-called "recovery", or "restoration" or "fly-back" converter, the secondary winding of the transformer is in the opposite direction to the primary winding and the secondary circuit only produces energy during the disabled phases of the switch.

The secondary winding of the transformer in these circuits comprises a large number of turns for, since the energy is only transmitted to the secondary circuit during the fraction of the period of the chopped signal, the voltage at the terminals of the secondary must be higher than the output voltage. Furthermore, because of their high number, the turns are wound in several layers which create therebetween parasite capacities which cause energy losses which are a function of the square of the voltage. Thus it is very difficult to construct a converter having a good efficiency at a high output voltage, for example of the order of a kilovolt.

The invention overcomes these drawbacks.

SUMMARY OF THE INVENTION

The invention is characterized in that, so that all the input energy is transmitted to the secondary circuit of the transformer, the switch is mounted in parallel across the series assembly of the primary winding of the transformer and the capacitor of the primary circuit, and in that the secondary circuit comprises a bridge rectifier for rectifying an electric current flowing in one direction during one conducting phase of the switch and in another direction during the other conducting phase.

Since the switch is not in series with the primary winding of the transformer, a current may flow in this primary winding whatever the conducting phase of the switch. Thus, energy is supplied practically permanently to the secondary circuit; the result is that, for the same output DC voltage, the instantaneous maximum voltages are smaller than in known circuits where the secondary circuit only receives energy during a fraction of each period of the chopped signal. Thus, the number of turns of the secondary winding may be reduced, which reduces the parasite capacities and the corresponding energy losses.

BRIEF DESCRIPTION OF THE DRAWINGS

Other features and advantages of the invention will be clear from the description of some embodiments, this description being given with reference to the accompanying drawings in which:

FIG. 1 is a diagram of a converter of the invention;

FIG. 2 shows the voltages and currents in the circuit of FIG. 1 when the switch is conducting; and FIG. 3 also shows the voltages and currents in the circuit of FIG. 1 but when the switch is not conducting.

DESCRIPTION OF THE PREFERRED EMBODIMENTS

The converter shown in FIG. 1 is intended to convert a DC voltage $V_e$, applied between two input terminals 10 (positive) and 11 (negative) into an output DC voltage $V_s$, appearing between two output terminals 12 (positive) and 13 (negative), and of a higher value than the input voltage $V_e$.

The input DC voltage is filtered by an LC circuit comprising a capacitor 14, of capacity $C_1$, disposed between the terminals 10 and 11 and an inductance 15, of value $L_e$, one terminal of which is connected to the (+) terminal 10 and the other terminal of which is connected to a terminal of the primary winding 16 of the transformer 17. The second terminal of winding 16 is connected to the negative input terminal 11 through a capacitor 18 of capacity $C_2$. In parallel across the series assembly formed by winding 16 and capacitor 18 is disposed a switch 19 formed by an NPN power transistor whose base 20 receives chopping control signals which are supplied by a generator not shown.

The secondary winding 21 of transformer 17 is of the same direction as the primary winding 16. It is connected to a rectifier bridge formed from five diodes 22, 23, 24 and 25.

A terminal $21_1$ of the secondary 21 is connected to the cathode of diode 23 and to the anode of diode 24. The other terminal $21_2$ of secondary 21 is connected to the anode of diode 22 and to the cathode of diode 25. The anodes of diodes 23 and 25 are connected to a common terminal 27 which is connected, through a capacitor 28, called restoration capacitor and of a capacity $C_3$ to a terminal 29 common to the cathode of diode 22 and to the anode of diode 26. The cathodes of diodes 24 and 26 are connected to a common point 30 which is connected to the positive output terminal 12 through an inductance 31 of value $L_S$ forming part of an output LC filter which also comprises a capacitor 32 of capacity $C_4$ connected in parallel across the terminals 12 and 13.

Finally, the junction point 27 of the anodes of diodes 23 and 25 is also connected to the negative output terminal 13.

With reference to FIGS. 2 and 3 the operation of the converter shown in FIG. 1 will now be described under the following conditions: the permanent working conditions have been reached, the generator connected to the base 20 of transistor 19 supplies signals such that the disabled and enabled times of this transistor are practically equal, and the load 33 connected between terminals 12 and 13 is formed by a resistor in which flows a current of intensity I.

On these assumptions it can be shown that the mean voltage at the terminals of the capacitor 18 is equal to the input voltage $V_e$.

Reference is made first of all to FIG. 2 which corresponds to saturation of transistor 19. IN this case, a current of intensity $I_{TP}$ flows in the primary 16 of transformer 17 which comes from the discharge of capacitor 18. This current of variable intensity causes a voltage $V_{TS}$ to appear at the terminals of the secondary winding 21 and a current I to pass into this winding of the same direction as the voltage $V_{TS}$, this winding being an energy generator. Thus, the path of current I is, starting from terminal $21_1$: diode 24, then inductance 31; from there it separates into two to flow through capacitor 32 with an intensity $I_C$ and through load 33 with an intensity $I_R$. This current then comes back to terminal $21_2$ by flowing through diode 25.

Diodes 22, 23 and 26 as well as capacitor 28 have been shown with broken lines so as to show that these elements, in this phase, do not have a current flowing therethrough.

Reference will now be made to FIG. 3 which corresponds to the disabled state of transistor 19.

In this condition, the voltage $V_{TP}$ at the terminals of the primary winding 16 is reversed and the current $I_L$ which flows through this winding changes direction. This current comes from the inductance 15 which restores the energy which it had accumulated during the saturation phase of transistor 19. In this state, the capacitor 18 is charged.

The voltage $V_{TS}$ at the terminals of the secondary winding 21 also changes direction; the same goes for the current I in this secondary winding 21. The value of the voltage $V_{TS}$ increases rapidly because of the rapid growth of voltage $V_{TP}$ in the primary 16. When this voltage $V_{TS}$ reaches the voltage at the terminals of the charged capacitor 28, the current I flows as shown in FIG. 3, i.e. starting from terminal $21_2$, it passes through diode 22 and, at the junction point 29, it is divided into two currents, one of which $I_1$ flows through the capacitor 28 and the other $I_2$ through the diode 26. The current $I_1$ flowing through capacitor 28 then passes through diode 23 and comes back to terminal $21_1$. The current $I_2$, after flowing through diode 26, passes through inductance 31, then through the parallel assembly of capacitor 32 and load 33 and comes back through diode 23 to terminal $21_1$.

As for FIG. 2, the elements which, in this phase, do not have a current flowing therethrough have been shown with broken lines; it is a question of diodes 24 and 25 and transistor 19.

Capacitor 28 has two currents $I_1$, $I_2$ flowing therethrough in opposite directions. At the beginning of the disabled phase of transistor 19, the charging current $I_1$ of capacitor 28 overrides the discharge current $I_2$. During the second part of the disabled phase of transistor 19, the current produced by winding 21 has an intensity less than that of the current in inductance 31, capacitor 28 being discharged; it provides the difference between the currents in winding 21 and in inductance 31.

It follows from these considerations that the current flowing in capacitor 28 does not represent the total current I but only a fraction, for example 20%, thereof. It should further be noted that, over a chopping period, this fraction of the current which passes through capacitor 28 is reduced by half, i.e. 10% in the example.

The converter of the invention has numerous advantages not only with respect to a circuit of the forward type but also with respect to a circuit of the restoration or fly-back type.

In such known circuits, as already mentioned, the switch is in series with the primary winding of the transformer and a capacitor is in parallel across this series assembly. In the direct type circuit, the secondary winding is of the same direction as the primary winding and rectification is obtained by means of two diodes whose anodes are connected to a respective terminal of the secondary and whose cathodes have a common terminal connected to the inductance of the output filter. In the circuit of the restoration type, the secondary winding is in a direction opposite the primary winding and rectification is obtained by means of a single diode whose anode is connected to a terminal of the secondary and whose cathode is connected to the other terminal of this secondary through a capacitor similar to capacitor 28.

In these two types of circuit, because the switch is in series with the primary winding of the transformer, this latter is used disymmetrically, the induction of the magnetic circuit always having the same sign. On the other hand, with the circuit of the invention, the transformer is used symmetrically: the induction takes on the two signs. Thus, for the same magnetic circuit and for the same performances, a transformer may be used with the invention having twice less turns in the primary than in a conventional circuit.

Moreover, since in conventional circuits the energy is only transmitted to the secondary for half the time, in these circuits, in order to obtain the same output voltage, a voltage is required at the terminals of the secondary twice as great as with the circuit of FIG. 1 where the energy is transmitted to the secondary during both conducting phases of transistor 19. The result is that the transformation ratio with the invention is only half as high as with conventional circuits.

To sum up, with respect to conventional circuits and for the same performances, the transformer will have twice less turns in the primary and four times less turns in the secondary. Consequently, the energy losses will be much lower than with conventional circuits, particularly at high voltages. In fact, since the turns are four times less numerous, the parasite capacities are theoretically four times smaller and, since on the one hand the charging energy is proportional to the capacity and proportional to the square of the voltage and on the other hand this voltage is twice smaller, the charging energy of the parasite capacities is sixteen times smaller.

In a circuit of the direct type, the voltage at the terminals of the inductance of the output filter is equal to the output voltage $V_s$ whereas, with the circuit of the invention, the voltage at the terminals of the inductance 31 is zero. It has been found that for the same filtering quality, the inductance 31 of the circuit of FIG. 1 may be ten times smaller than the corresponding inductance of a conventional circuit of the direct type.

However, in a circuit of the restoration type, the inductance of the output filter is also of small size, but the capacitor of the rectifying circuit has, in the restoration circuit, a high effective current flowing therethrough, about 50% of the output current, whereas with the converter of the invention the capacitor 28 of the rectifier circuit has only about 10% of the current flowing therethrough. The result is that the capacitor 28 is subjected to less stresses than the capacitor of the rectifier circuit of the restoration circuit and that thus its lifespan is increased.

Of course, switch 19 need not necessarily be formed by a transistor. It is sufficient generally for it to form a controllable switch.

Finally, the invention applies also when the transformer 17 is not of the booster type. It presents an advantage when the output voltage is high, even if the transformer is of the 1/1 type or even a voltage dropper type.

What is claimed is:

1. In a DC-DC converter, for example of the voltage booster type, comprising a single switch controlled for chopping the input signal, a single transformer whose primary winding receives the chopped signal and a means for rectifying the signal supplied by the secondary winding of the transformer, in order that all the input energy is transmitted to the secondary circuit of the transformer, the input signal is applied to the terminals of the series assembly formed by the primary winding of the transformer and a capacitor, the chopping switch being in parallel across the series assembly, and the rectifier means comprises a bridge for rectifying a current, supplied by the secondary winding of the transformer, flowing in one direction during one conducting phase of the switch and in another direction during the other conducting phase, wherein said rectifier bridge comprises a restoration capacitor which, at the beginning of the disabled period of said switch, is charged by the current supplied by the secondary winding and which is discharged during a second phase of the disabled period of the switch.

2. The converter as claimed in claim 1, wherein said primary and secondary windings of the transformer are of the same direction.

3. The converter as claimed in claim 1, wherein said rectifier bridge comprises a first diode whose anode is connected to a first terminal of the secondary winding, a second diode whose cathode is connected to the second terminal of the secondary winding, a third diode whose anode is connected to the second terminal of the secondary, a fourth diode whose cathode is connected to the first terminal of the secondary and whose anode is connected to the anode of the second diode and, through the restoration capacitor, to the cathode of the first diode and to the anode of a fifth diode whose cathode is connected to that of the third diode, the point common to these latter cathodes forming an output terminal of the bridge, the second output terminal being the common point to the anodes of the second and fourth diodes.

4. The converter as claimed in claim 1, further comprising an input filter of the LC type with a capacitor between the input terminals and an inductance disposed between one input terminal and the terminal of the switch which is opposite the second input terminal.

5. The converter as claimed in claim 1, comprising an output filter of the LC type having an inductance between one output terminal of the rectifier bridge and a first output terminal of the converter and a capacitor between this first output terminal of a converter and the second output terminal of the converter.

6. The converter as claimed in claim 1, wherein the chopping switch comprises a power transistor.

7. The converter as claimed in any one of the claim 1, wherein the output voltage is of the order of a kilovolt.

8. The converter as claimed in claim 1, wherein the transformer is of the booster type.

* * * * *